United States Patent
Long

[19]

[11] Patent Number: 5,871,701
[45] Date of Patent: Feb. 16, 1999

[54] OZONE GENERATOR WITH SMALL-DIAMETER DIELECTRIC TUBES

[76] Inventor: Ron Long, 122 Scott River Rd., Fort Jones, Calif. 96032

[21] Appl. No.: 825,321

[22] Filed: Apr. 1, 1997

[51] Int. Cl.⁶ .................................................. B01J 19/12
[52] U.S. Cl. ................................ 422/186.18; 422/186.19
[58] Field of Search ........................ 422/186.07, 186.18, 422/186.19; 204/176

[56] References Cited

U.S. PATENT DOCUMENTS

| | | | |
|---|---|---|---|
| Re. 34,571 | 3/1994 | Uys | 422/186.07 |
| 788,557 | 5/1905 | Sahlstrom | 422/186.18 |
| 919,403 | 4/1909 | Vosmaer | 422/186.18 |
| 919,445 | 4/1909 | Lohman | 422/186.18 |
| 1,136,227 | 4/1915 | Goldberg | 422/186.18 |
| 1,403,025 | 1/1922 | Haase | 422/186.18 |
| 1,796,110 | 3/1931 | Lechler | 422/186.18 |
| 3,766,051 | 10/1973 | Bollyky | 204/321 |
| 3,942,020 | 3/1976 | Ciambrone | 250/539 |
| 4,214,995 | 7/1980 | Saylor | 250/539 |
| 4,216,096 | 8/1980 | Pare et al. | 250/539 |
| 4,603,031 | 7/1986 | Gelbman | 422/186.18 |
| 4,614,573 | 9/1986 | Masuda | 204/176 |
| 4,619,763 | 10/1986 | O'Brien | 210/177 |
| 4,656,010 | 4/1987 | Leitzke et al. | 422/186.18 |
| 4,690,803 | 9/1987 | Hirth | 422/186.18 |
| 4,790,980 | 12/1988 | Erni et al. | 422/186.15 |
| 4,960,570 | 10/1990 | Mechtersheimer | 422/186.21 |
| 4,963,331 | 10/1990 | Mouw | 422/186.18 |
| 4,981,656 | 1/1991 | Leitzke | 422/186.18 |
| 5,008,087 | 4/1991 | Batchelor | 422/186.22 |
| 5,009,858 | 4/1991 | Mechtersheimer | 422/186.19 |
| 5,089,098 | 2/1992 | Tacchi | 204/176 |
| 5,093,087 | 3/1992 | Freeman | 422/186.15 |
| 5,258,165 | 11/1993 | Olsen | 422/186.18 |
| 5,348,709 | 9/1994 | Wheatley | 422/186.18 |
| 5,501,844 | 3/1996 | Kasting, Jr. et al. | 422/186.15 |
| 5,503,809 | 4/1996 | Coate et al. | 422/186.18 |
| 5,545,379 | 8/1996 | Gray | 422/186.04 |
| 5,630,990 | 5/1997 | Conrad et al. | 422/186.07 |

*Primary Examiner*—Daniel J. Jenkins
*Attorney, Agent, or Firm*—Browdy and Neimark

[57] ABSTRACT

A corona-type, air-cooled ozone generator has a cluster of ganged cylindrical generator units (100) packed into a cylindrical pipe (10). Each unit has an inner electrode (101), a dielectric tube around the inner electrode (103), and a concentric outer electrode (102 with side wall openings (112). The corona air gap is between the dielectric and the outer electrode. The inner electrode and dielectric tube are held in each respective outer electrode with silicone end pieces (152, 151). Voltage is put on the inner electrodes while air is blown through the pipe from a blower (30); the air passes through the gaps between the units' ends and circulates through side wall openings, passing over the dielectric tubes and cooling them. Because the dielectric tubes are small, for example 0.25 inches across, they lose heat quickly and do not reach a high temperature. The generator is compact.

9 Claims, 2 Drawing Sheets

OZONE GENERATOR WITH SMALL-DIAMETER DIELECTRIC TUBES

FIELD OF THE INVENTION

The present invention relates to corona-type ozone generators for ozonating air.

BACKGROUND OF THE INVENTION

Ozone, which chemically is three oxygen atoms joined into a molecule (formula $O_2$), is a highly reactive gas and a very strong oxidizer because it readily splits into a stable atmospheric oxygen molecules (formula $O_2$) and a free single oxygen atom. Ozone has many and varied uses: it kills bacteria and viruses, purifies water, deodorizes carpets, bleaches fabrics, and so on.

In many applications there has been a need for a strong draft of ozonated air, of up to 100 cubic feet of air per minutes, from a compact ozone generator. However, the existing technology has not met this need for a compact, simple ozone generator with a high air-flow rate.

Ozone generators for ozonating air are of two basic types; ultraviolet and corona.

The ultraviolet type employs gas-discharge lamps which emit bright ultraviolet light (also called "UV" or "black light" lamps), which breaks up atmospheric oxygen and thus creates ozone. Because the UV lamps are bulky, an ultraviolet generator cannot be very compact. The lamps are also fragile and expensive and can burn out.

The corona or Siemens type creates ozone by subjecting air to a very high electric field. Typically the strong electric field is supplied from a transformer, which converts ordinary line current at 115 volts into alternating current (AC) at about 6000 volts, sufficient to break up oxygen molecules. The high-voltage coil of the transformer is connected to two electrodes so that one goes positive when the other is negative. The two electrodes form a sort of capacitor, and usually comprises two parallel plates, concentric cylinders, or some other geometry which allows for a constant distance between the electrodes. A dielectric (insulating) material, typically plastic or ceramic, is often included in between the two metal electrodes; however, it does not fill the gap completely because air to be ozonated must circulate through. The dielectric provides a solid insulator to prevent shorting between the electrodes and also intensifiers the electric field.

Ozone generators create substantial amounts of heat, and indeed heat build-up is a basic limited factor in ozone generators. To produce a great deal of ozone requires a large volume of air subjected to strong electric fields. Under these conditions, heat builds up quickly inside the dielectric material because of the strong alternating electric field to which it is subjected. This heating of the dielectric is analogous to heating in a microwave oven. The dielectrics can suffer a shortened life, melt, crack, and so on. Air temperatures above 130 degrees Fahrenheit also interfere with ozone production.

(The metal electrodes do not generate so much heat internally as dielectrics, and are better able to withstand elevated temperatures; of course, the air between the electrodes can be heated without damage.)

Previous workers in the field above have devoted considerable energy to the problem of removing heat from the dielectric. Often the cooling is quite elaborate. For example, U.S. Pat. No. 3,766,051 discloses concentric tubes electrodes with coolant fluid both inside the inner electrode and outside the outer electrode. Another example is U.S. Pat. No. 4,960,570 issued to Mechtersheimer shows an arrangement with cooling fluid circulating outside electrode plates (labeled 1 and 2) and also inside electrode tubes (3) held in a row between the plates.

It is much less expensive, and simpler, to cool the dielectric with air. However, if only air is used then the problem of heat removal is made more difficult, because air, compared to a liquid like water, is a thermal insulator and cannot hold as much heat per unit volume. One need only imagine standing in 60-degree air while wearing a swim suit and standing in 60-degree water while dressed the same. Water removes heat from the body about 3600 times faster than air does.

Moreover, the heat problem becomes worse as the ozone generating unit is made smaller and more compact. Clearly, to produce ozone at a certain rate, heat must also be generated at a certain rate; but the smaller the unit, the less the internal and external surface area is from which the heat can be lost, and the higher the temperature of the unit becomes.

Thus, the problem of producing an ozone generator which is both compact and air-cooled is double difficult. Prior workers have not solved it.

Batchelor, in U.S. Pat. No. 5,008,087, discusses the heat problem and attempts to solve it by using reversing air flow. Air is injected into the annular gap between a round inner electrode (12) and the inside of a dielectric tube (16). At the far end the air is forced to reverse direction and flow between the outside of the dielectric tube and a tubular outer electrode (14). This is claimed to reduce the temperature differential between the inside and outside surfaces of the dielectric tube, reducing the risk of heat cracking (at column 2, lines 25–54). The diameter of the inner electrode is given as 1.25 inches.

Aside from the obvious fact that the outside surface of the dielectric tube is being "cooled" with already-heated air, reversing the flow increases air resistance and makes the design more bulky, since the air is removed from the same end at which it is injected. The air needs to turn many corners, the flow is not straight-through, and the diameter of the unit is increased.

A "Compact Ozone Generator" is described by Coate in U.S. Pat. No. 5,503,809. An inner dielectric tube (18) and an outer dielectric tube (16) have electrodes in between them, within, and without. Air flows through the inner tube, reverses, and flows out in the annular space between the tubes. Unlike Batchelor, Coate does not attribute cooling properties to the reverse flow, and instead advises (column 3, line 49) that the feed air be chilled to cool the unit. The refrigeration unit required for this will naturally obviate any advantages of Coate's "compact" design.

The conventional technology has not provided an effective solution to the heat problem in air-cooled ozone generators. It has particularly not provided a compact, large output, air-cooled ozone generator which can eliminate heat from the dielectrics at the required rate.

SUMMARY OF THE INVENTION

The present invention realizes it object, a compact, large output, air-cooled ozone generator, by employ simple but highly effective principle, which previous workers have not even come close to realizing: small objects lose heat more rapidly that large ones do.

Why is this so? A small object has a larger ratio of surface area to volume than a large object does. (Breaking up a large rock does not decrease its volume, but it exposes a great deal of surface.) Heat can only leave an object through its surface. Therefore, a small object will cool much faster than a large one does. The white-hot but tiny metal filament of an ordinary incandescent light bulb stops glowing in a second, but a white-hit ingot will glow for minutes.

In the dielectric of an ozone generator, heat is being generated at a constant rate throughout every part of the dielectric. If the dielectric is large, the generated heat will have to travel farther to reach the surface and leave, so the heat will build up, and the temperature will rise. Similarly, if the dielectric has a shape that maximizes the surface area, this will tend to keep it cool.

The present invention makes the dielectric as small as possible to maximize its surface area, and through this simple but elegant solution achieves what those who came before could not: an ozone generator that is compact and has a high rate of air flow-through with good ozone production.

Specifically, the invention achieves its object as follows:

First, it employs a tubular dielectric as opposed to a flat plate construction because cylinders have a larger ratio of surface to volume than does a plate. (The plate can be sawn into strips, and the strips rounded into cylinders, exposing more surface area.) The tubular dielectric surrounds the inner electrode and is surrounded by the outer electrode.

Second, it makes the dielectric smaller in diameter by placing it in contact (or close to) the inner electrode and leaving the air gap or corona space between the dielectric and the inside surface of the outer, tubular electrode. If the dielectric were instead made to contact the outer electrode, it would need to be larger in diameter.

Third, it employs a solid inner electrode instead of a tubular one, to minimize the inner electrode diameter while maintaining sufficient mechanical stiffness. The smaller the inner electrode, the smaller can be the dielectric tube which fits over it. The preferred diameter of the inner electrode is 1/8 inch; the preferred outer diameter of the dielectric tube is 1/4 inch.

Fourth, the outer electrode of the generator is perforated. This allows air to pass easily into and out of the corona space between the dielectric tube and the outer electrode.

Fifth, the generator unit is ganged with others in a compact bundle, preferably of seven parallel units, and placed inside a larger pipe. Air can pass into and out of the bundle in the spaces between the units. While it flows through, turbulence causes the air to pass through the holes in the outer electrodes and mix with air in the corona discharge spaces. Thus, the dielectric tubes are cooled effectively. The straight-through air flow within the larger pipe makes the ozone generator of the invention as compact as is possible.

The present invention has other objects, including that of overcoming deficiencies in the prior art such as noted above, that will be apparent from the following discussion.

BRIEF DESCRIPTION OF THE DRAWING

The above and other objects and the nature and advantages of the present invention will become more apparent from the following detailed description of an embodiment(s) taken in conjunction with drawings, wherein.

DETAILED DESCRIPTION OF THE PREFERRED EMBODIMENT

Here, and in the following claims:

"Pipe" and "tube" mean any hollow object open at both ends, and not only round or cylindrical objects; these terms include hollow objects with square, rectangular, triangular, or other prismatic cross-sections, those that are polygonal with rounded corners, those with lobes, and so on. It also includes non-prismatic objects, such as those with bulges or waists, those that are curved, etc..

"Voltage supply" means any conventional source of electrical current or voltage, whether AC or DC, and includes batteries, transformers, and other conventional components for generating, storing, or transforming electricity. It also includes wires, jacks, couplings and other connection devices needed to bring a voltage or current to an electrode.

Figure 1:
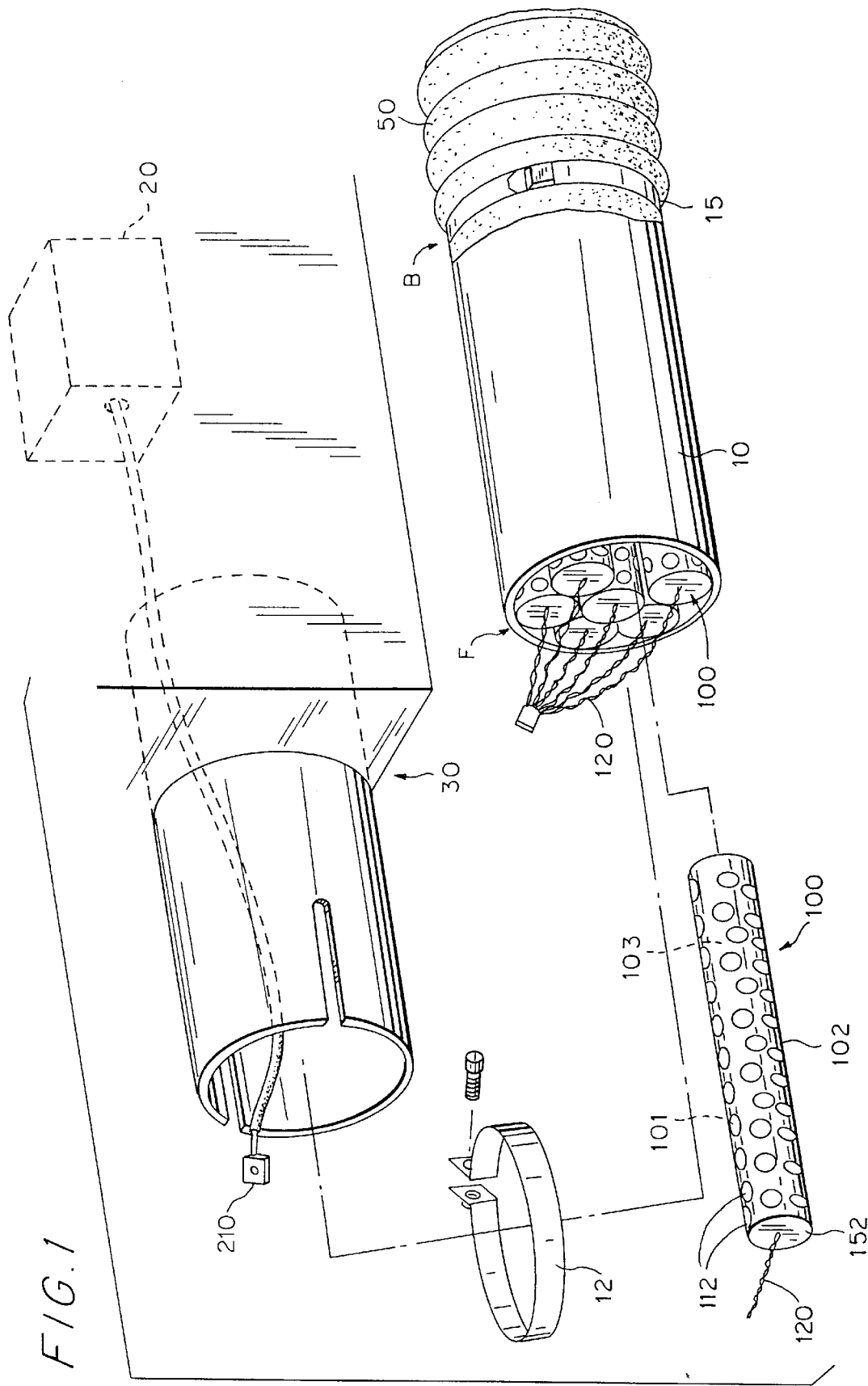
FIG. 1 is a partially exploded perspective view of the invention.

FIG. 1 shows a preferred embodiment of the present invention in overview. A pipe 10, which preferably is round, is packed with units 100, each preferably cylindrical. The sizes of the pipe 10 and units 100 are best chosen so that a number of the units 10 are held in stable arrangement inside the pipe 10, while touching each other and the inside surface of the pipe 10.

Figure 2:
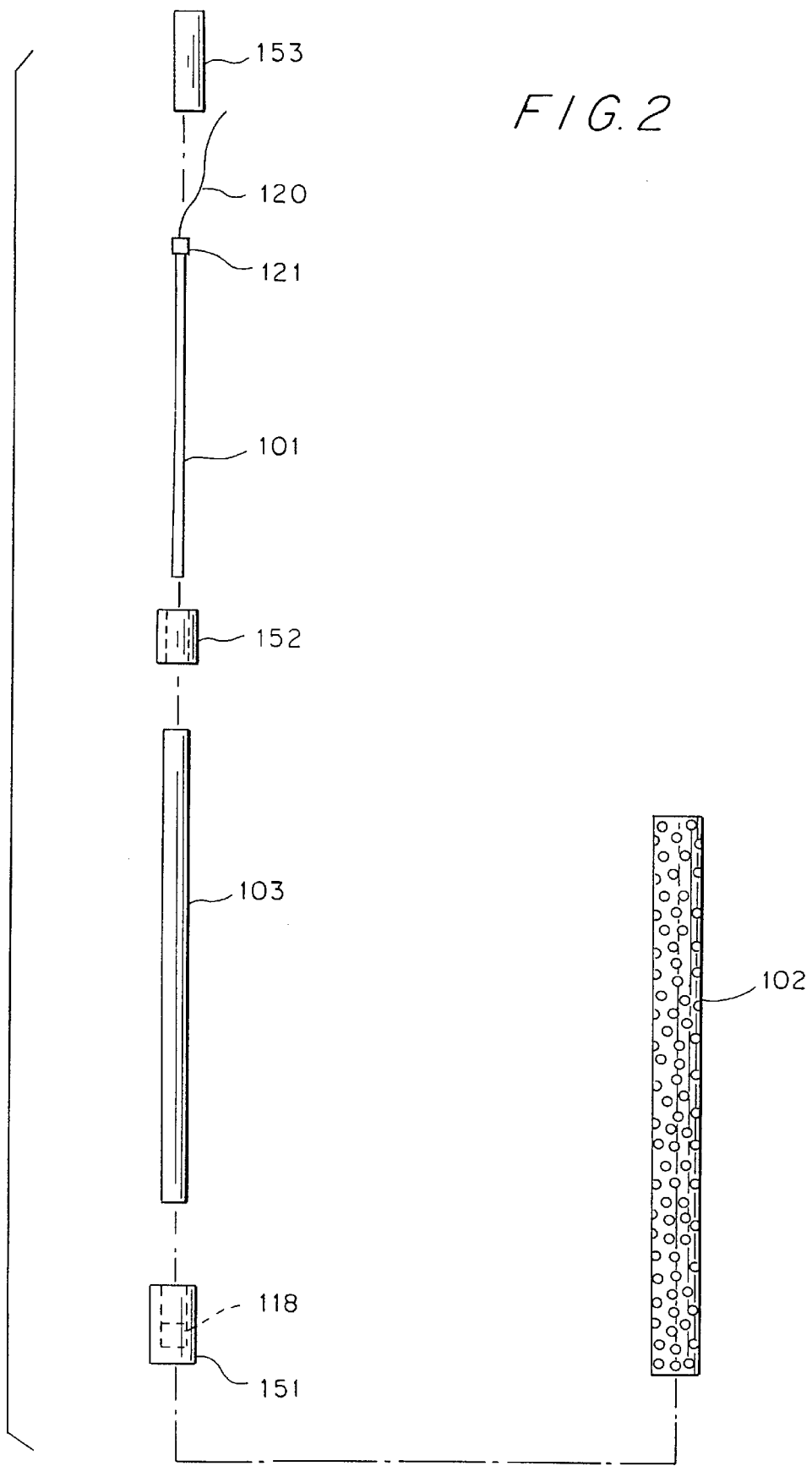
FIG. 2 is an exploded plan view of one unit of the invention.

One of the units 100 is shown exploded out of the pipe 10, making visible the perforated second or outer electrode 102, end gasket 152, and coupling wire 120. (Other parts of the unit 100, including a first inner electrode 101 and a dielectric tube 103, are shown in FIG. 2)

FIG. 1 illustrates how the units 100, even though packed into the pipe 10, have gaps or spaces between them which allow air to pass into the front end F of the pipe 10, on through, and out the back end B. The end gaskets 152 of the various units are preferably solid rubbery insulating material such as silicone material, RTV, or the like. Being solid, they will block air from flowing into the ends of the units; however, the invention also includes gaskets with holes to allow air to pass into the units through their ends, which would augment the air through-flow.

When the units 100 are round and are close-packed as shown, the impedance to the air flow resulting from the solid ends of the gaskets 152 does not hinder the operation because the proportion of open space is sufficient.

Cylindrical units will be self-aligning inside a round pipe if the number is 3, 7, etc. Preferably, the units 100 are packed in tight enough that the units 100 and pipe 10 are in mutual contact, which can increase the amount of heat dissipated through the wall of the pipe 10. The pipe 10 is preferably of aluminum for good thermal conductivity.

FIG. 2 shows the internal construction of a unit 100. The inner electrode 101 is preferably a 1/8-inch diameter stainless steel rod, which provides enough mechanical support for the dielectric tube 103 into which the electrode 101 is inserted. The dielectric tube 103 is preferably of ceramic material, having an inside diameter of 1/8 of an inch so that it contacts the inner electrode 101, and an outer diameter of 1/4 inch. The tube 103 may be of other shapes, such as square or octagonal, for example.

The outer electrode 102 is preferably of stainless steel and tubular, though it may also be formed of sheet metal bent into a shape to generally surround the dielectric tube 103. Its side wall includes numerous perforations or other openings 112, which may be shaped as circles, slots, and so on. The side wall may additionally include protrusions or other shapes to increase the surface area. The preferred inside diameter is 3/8 inch.

In alternative embodiments (not shown) the second electrodes can be rods, sinuous plates, or other members able to be interspersed among the dielectric tubes so as to create the electric fields needed for ozone generation. Such members can be supported by end plates of the pipe 10.

The dielectric tube 103 is preferably a slight press fit onto the inner electrode 101. The outer electrode 102 is held in position relative to the dielectric tube 103 at one end by the gasket 152, which is an annular member press-fitted in place and made of a resilient electrical insulator like silicone. At the other end to two parts are located by a boot 151 preferably made of the same material. As seen in the drawing, the boot 151 includes a blind hold and the gasket 152 includes a through-hole. A flexible wire 120 is welded or otherwise attached to the inner electrode 101 at the front end, so that the inner electrode can be charged by the power supply 20 (FIG. 1). A length of heat shrink tubing 153 can be placed over the weld.

The electrode 101 may be fastened to the gasket 152, and also to the inside of the boot 151 with silicone adhesive, e.g. type 118. The outer electrode 102 is held to the outside of the boot 151 and gasket 152 by friction, although adhesive can be used there as well. The invention also includes mechanical fasteners and other conventional devices and methods for assembling a unit.

Returning to FIG. 1, the ozone generator (pipe 10 with units 100) is seen to be adapted to coupling to auxiliary equipment. A blower 30 is adapted to be joined to the pipe 10 via a clamp 12; other conventional means can also be used. The blower 30 creates pressure that forces air into the front end F of the generator and out the back end B, whence it passes into a flexible hose 50 fastened with a second clamp 15. A power supply 20 includes a connection 210 which couples to the flexible wires 120 from the units 100.

In use, air flows through the generator while the power supply 20 electrifies the inner electrodes 101 with alternating current at about 4000 volts. The pipe 10 and the outer electrodes 102 are kept at ground potential for safety.

In the embodiment shown, the preferred outer diameter of the tube 103 is ¼ inch, and the pipe is less that two inches across. This very compact construction does not result in excessive heat, however, since the dielectrics are very small.

As discussed above, the smaller the outer diameter of the dielectric tube the more quickly will it dissipate heat that is generated inside the dielectric by its exposure to the strong alternating electric field between the inner and outer electrodes. Air flowing through the generator will pass in and out of the side wall openings 112 in the outer electrode 102 due to turbulence, and so the ozonated air in the corona space will leave and fresh, cool air will enter each of the units 100.

If the units 100 are very long then a very thin inner electrode 101 and dielectric tube 103 may have insufficient rigidity. The invention includes selection of the minimum practical diameters of the dielectric tube 103 and inner electrode 101 for a given unit length, and also for given materials which may be more or less strong or rigid. The invention also includes stiffening members for lateral reinforcement, such as ribs and insulating spacers.

The industrial applicability is in ozone generation. The problem solved by the invention is the lack of a compact air-cooled, high output ozone generator. The foregoing description of the specific embodiments will as fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology of terminology employed herein is for the purpose of description and not of limitation.

What is claimed is:

1. A corona, air cooled ozone generator to be coupled to a voltage supply, the generator comprising:

a first plurality of first electrodes;

dielectric tubes equal to the first plurality in number, each dielectric surrounding a respective one of the first electrodes, a second plurality of second electrodes interspersed among the first electrodes;

a pipe surrounding the first electrodes and the second electrodes, the pipe being substantially open at a front end thereof and a back end thereof, whereby air is flowable axially through the pipe into the front end and out the back end;

coupling means for electrically coupling the voltage supply to the first electrodes and the second electrodes in opposing polarities; and circulating means for air passing through the pipe to circulate among the electrodes and flow adjacent the dielectric tubes;

whereby air for cooling and ozone generation passes unidirectionally through the pipe from the front end to the back end;

wherein each of the second electrodes includes a side wall substantially surrounding a respective one of the dielectric tubes, and wherein the circulating means includes side wall openings in at least one side wall.

2. The ozone generator according to claim 1, wherein the side walls are generally tubular.

3. The ozone generator according to claim 2, wherein the number of dielectric tubes is seven.

4. The ozone generator according to claim 2, wherein the number of dielectric tubes is three.

5. The ozone generator according to claim 1, including silicone support pieces disposed between the dielectric tube and the outer electrode.

6. The ozone generator according to claim 1, wherein each of the inner electrodes includes a solid rod.

7. A corona ozone generator, for use with a voltage supply, comprising:

a pipe having an inside surface;

a plurality of parallel elongated ozone generating units disposed in the pipe, each of the units being in at least partial contact with another one of the units or the inside surface of the pipe;

air gap means for air to pass axially along the pipes and between the units;

at least some of the units including side wall openings.

8. The ozone generator according to claim 1, wherein the dielectric tubes are less than 1.25 inches in diameter.

9. The ozone generator according to claim 6, wherein the dielectric tubes surround respective ones of the first electrode closely and contact them.

* * * * *